(12) United States Patent
Nakanishi et al.

(10) Patent No.: US 9,297,931 B2
(45) Date of Patent: Mar. 29, 2016

(54) POLARIZING FILM, IMAGE DISPLAY DEVICE, AND METHOD FOR PRODUCING POLARIZING FILM

(71) Applicant: NITTO DENKO CORPORATION, Ibaraki-shi, Osaka (JP)

(72) Inventors: Sadahiro Nakanishi, Ibaraki (JP); Miyuki Kurogi, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/352,212

(22) PCT Filed: Jan. 8, 2013

(86) PCT No.: PCT/JP2013/050084
§ 371 (c)(1),
(2) Date: Apr. 16, 2014

(87) PCT Pub. No.: WO2013/128950
PCT Pub. Date: Sep. 6, 2013

(65) Prior Publication Data
US 2014/0246632 A1    Sep. 4, 2014

(30) Foreign Application Priority Data

Feb. 28, 2012  (JP) ................. 2012-041132

(51) Int. Cl.
*F21V 9/14*    (2006.01)
*G02B 5/30*    (2006.01)
(Continued)

(52) U.S. Cl.
CPC . *G02B 1/08* (2013.01); *C09B 31/08* (2013.01); *C09B 67/0097* (2013.01); *G02B 5/3025* (2013.01)

(58) Field of Classification Search
USPC ............ 8/437, 527, 681, 919; 252/585; 534/670, 728, 829, 833, 836, 827; 349/96
See application file for complete search history.

(56) References Cited

U.S. PATENT DOCUMENTS

| 6,084,078 A | 7/2000 | Mennicke |
| 2009/0083913 A1 | 4/2009 | Kaser et al. |
| 2010/0221548 A1 | 9/2010 | Inoue et al. |

FOREIGN PATENT DOCUMENTS

| CN | 101213261 A | 7/2008 |
| JP | 60-168743 A | 9/1985 |

(Continued)

OTHER PUBLICATIONS

International Search Report for PCT/JP2013/050084, Mailing Date of Mar. 19, 2013.

(Continued)

*Primary Examiner* — Bijan Ahvazi
(74) *Attorney, Agent, or Firm* — Westerman, Hattori, Daniels & Adrian, LLP

(57) ABSTRACT

The present invention provides a polarizing film having a high dichroic ratio. The polarizing film contains a disazo compound represented by the following general formula (1). In the general formula (1), $Q^1$ represents a phenyl group having at least one $-SO_3M$ group; $Q^2$ represents a naphthylene group having at least one $-SO_3M$ group; X represents an alkyl group having 1 to 4 carbon atoms, an alkoxy group having 1 to 4 carbon atoms, a thioalkyl group having 1 to 4 carbon atoms, a halogeno group, or a polar group; subscript k denotes the number of substitutions of X and represents an integer of 0 to 5; and M represents a counter ion, where when k is an integer of 2 or more, Xs are the same or different.

(1)

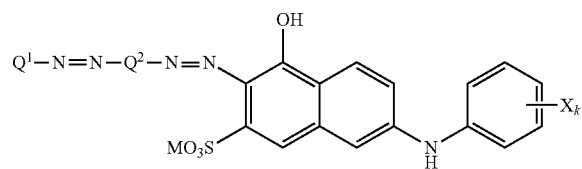

6 Claims, 1 Drawing Sheet

(51) Int. Cl.
*G02C 7/12* (2006.01)
*G02B 1/08* (2006.01)
*C09B 31/08* (2006.01)
*C09B 67/02* (2006.01)
*C09B 31/02* (2006.01)
*C09B 33/02* (2006.01)
*C09B 3/08* (2006.01)

(56) References Cited

FOREIGN PATENT DOCUMENTS

| | | |
|---|---|---|
| JP | 02-309302 A | 12/1990 |
| JP | 07-92531 B2 | 10/1995 |
| JP | 11-43617 A | 2/1999 |
| TW | 200946986 A | 11/2009 |
| WO | 2007/003524 A1 | 1/2007 |

OTHER PUBLICATIONS

Taiwanese Office Action dated Nov. 20, 2014, issued in Taiwanese Application No. 102102325; w/English translation. (10 pages).

Office Action dated Mar. 19, 2015, issued in corresponding Korean Application No. 10-2013-7024119, w/partial English translation. (7 pages).

Japanese Office Action dated Nov. 13, 2015, issued in counterpart Japanese patent application No. 2012-041132, with partial English translation, (4 pages).

POLARIZING FILM, IMAGE DISPLAY DEVICE, AND METHOD FOR PRODUCING POLARIZING FILM

TECHNICAL FIELD

The present invention relates to a polarizing film having a high dichroic ratio, a method for producing the polarizing film, and an image display device including the polarizing film.

BACKGROUND ART

A polarizing film is an optical member having a function to transmit specific linearly polarized light from polarized light or natural light.

General-purpose polarizing films are obtained by, for example, drawing a polyvinyl alcohol film dyed with iodine.

Polarizing films obtained by a solution casting method are also known. The solution casting method is a method of forming a polarizing film on a substrate by applying onto the substrate a coating solution containing a colorant material and a solvent.

A polarizing film obtained by a solution coating method has the advantage that its thickness is remarkably small as compared to a polarizing film obtained by drawing the polyvinyl alcohol film as described above.

Conventionally, a polarizing film containing a disazo compound represented by the following general formula (I) is known as a polarizing film obtained by a solution coating method (Patent Document 1).

In the general formula (I), A represents a naphthyl group that may be substituted with a hydroxyl group, an amino group, or a sulfonic acid group, and B represents a phenylene group or a naphthylene group that may be substituted with a lower alkyl group, a lower alkoxy group, a hydroxyl group, or a sulfonic acid group.

However, the polarizing film in Patent Document 1 has the problem of poor transparency and a low dichroic ratio.

Further, a disazo compound that can be inexpensively synthesized is required for producing an inexpensive polarizing film.

[Patent Document 1]

Japanese Examined Patent Publication No. 7-92531 (Japanese Patent Laid-open Publication No. 62-330213)

An object of the present invention is to provide a polarizing film having a high dichroic ratio and a method for producing the polarizing film.

The polarizing film of the present invention contains a disazo compound represented by the following general formula (1).

$Q^1$ represents a phenyl group having at least one —$SO_3M$ group, $Q^2$ represents a naphthylene group having at least one —$SO_3M$ group, X represents an alkyl group having 1 to 4 carbon atoms, an alkoxy group having 1 to 4 carbon atoms, a thioalkyl group having 1 to 4 carbon atoms, a halogeno group, or a polar group, subscript k denotes the number of substitutions of X and represents an integer of 0 to 5, and M represents a counter ion, where when k is an integer of 2 or more, Xs are the same or different.

Preferably, $Q^2$ is a naphthylene group represented by the following general formula (Q2-1), and more preferably it is a naphthylene group represented by any one of the following formulae.

Z represents a substituent other than the —$SO_3M$ group, subscript o denotes the number of substitutions of Z and represents an integer of 0 to 5, and subscript n denotes the number of substitutions of the —$SO_3M$ group and represents an integer of 1 to 6, where $1 \leq n+o \leq 6$, and when o is 2 or more. Zs are the same or different.

Preferably, $Q^1$ is a phenyl group represented by the following general formula (Q1-1), and more preferably a phenyl group represented by any one of the following formulae.

Y represents a substituent other than the —$SO_3M$ group, subscript m denotes the number of substitutions of Y and represents an integer of 0 to 4, and subscript l denotes the number of substitutions of the —$SO_3M$ group and represents an integer of 1 to 5, where $1 \leq l+m \leq 5$, and when m is 2 or more, Ys are the same or different.

In another aspect of the present invention, an image display device is provided.

This image display device includes any one of the polarizing film described above as its composition member.

In another aspect of the present invention, a method for producing a polarizing film is provided.

This method for producing a polarizing film includes a step of applying onto a substrate a coating solution containing a disazo compound represented by the above general formula (1) and a solvent.

A polarizing film of the present invention contains a disazo compound represented by the general formula (1), and therefore has a high dichroic ratio.

An image display device including such a polarizing film having a high dichroic ratio is excellent in display characteristics.

DESCRIPTION OF EMBODIMENTS

Hereinafter, the present invention is specifically described.

In the present specification, the wording "AAA to BBB" means that "AAA or more and BBB or less".

[Polarizing Film]

A polarizing film of the present invention contains a disazo compound represented by the following general formula (1).

The polarizing film of the present invention contains one or more selected from disazo compounds represented by the following general formula (1), and may contain other components as required.

The disazo compound represented by the general formula (1) is excellent in solubility in a solvent, and can form a stable association in a solvent.

A polarizing film formed from such a disazo compound has a high dichroic ratio.

The polarizing film of the present invention is an organic thin film formed from a coating film. The polarizing film of the present invention has a polarization property due to alignment of disazo compounds even though a special drawing treatment is not performed.

(1)

In the general formula (1), $Q^1$ represents a phenyl group having at least one —SO$_3$M group, $Q^2$ represents a naphthylene group having at least one —SO$_3$M group, X represents an alkyl group having 1 to 4 carbon atoms, an alkoxy group having 1 to 4 carbon atoms, a thioalkyl group having 1 to 4 carbon atoms, a halogeno group, or a polar group, subscript k denotes the number of substitutions of X and represents an integer of 0 to 5, and M represents a counter ion, where when k is an integer of 2 or more, Xs are the same or different.

Hereinafter, M of —SO$_3$M in all formulae represents a counter ion.

Examples of M (a counter ion) of —SO$_3$M include a hydrogen ion; an alkali metal ion such as Li, Na, K, and Cs; an alkali earth metal ion such as Ca, Sr, and Ba; other metal ions; an ammonium ion that may be substituted with an alkyl group or a hydroxyalkyl group; and a cation derived from an organic amine. Examples of the organic amine include a lower alkylamine having 1 to 6 carbon atoms, a lower alkylamine having 1 to 6 carbon atoms and a hydroxyl group, and a lower alkylamine having 1 to 6 carbon atoms and a carboxyl group. When two or more —SO$_3$Ms substitute in each general formula, each M may be the same or different. When M of —SO$_3$M is a divalent or higher-valent cation in each general formula, M is stabilized by electrostatically bonding to other anions, or M is stabilized by being covalently held by other disazo compounds.

Ms of —SO$_3$Ms each contained in $Q^1$ and $Q^2$ may be the same or different.

As X, one that does not reduce the solvent solubility of a disazo compound represented by the general formula (1) is preferably selected, and for example, X is preferably a polar group. A disazo compound of the general formula (1) in which X is a polar group is preferable because it is further excellent in solvent solubility, and is hardly crystallized in a polarizing film.

The polar group is not particularly limited as long as it is a functional group having polarity. Examples of the polar group include an amino group, a hydroxyl group, a carboxyl group, a carboxylic acid amide group, and other functional group containing oxygen and/or nitrogen atoms which have relatively high electronegativity.

The number of substitutions k is preferably an integer of 0 to 2, and more preferably an integer of 0 to 1.

A disazo compound of the general formula (1) not having a substituent X, that is, the number of substitutions k is 0, is represented by the following general formula (2).

In the general formula (2), $Q^1$, $Q^2$ and M represents the same as in the general formula (1).

(2)

$Q^1$ in the general formula (1) is not particularly limited as long as it is a phenyl group having at least one —SO$_3$M group as a substituent.

Examples of the phenyl group represented by $Q^1$ include a phenyl group having one —SO$_3$M group, a phenyl group having two or three —SO$_3$M groups, a phenyl group having four or five —SO$_3$M groups, and a phenyl group having one to four —SO$_3$M groups and a substituent other than the —SO$_3$M group.

When $Q^1$ is represented by the general formula, $Q_1$ is a phenyl group represented by the following general formula (Q1-1).

(Q1-1)

In the general formula (Q1-1), Y represents a substituent other than the —SO$_4$M group, subscript m denotes the number of substitutions of Y, subscript l denotes the number of substitutions of the —SO$_3$M group, l represents an integer of 1 to 5, and m represents an integer of 0 to 4. Here, $1 \leq l+m \leq 5$. When the number of substitutions m is 2 or more, each Y may be the same or different.

The substituent other than the —SO$_3$M group, which is represented by Y, is not particularly limited, but a substituent having an acyclic structure is preferable because it hardly hinders formation of an association. Specific examples of Y include a lower alkyl groups (an alkyl group having 1 to 6 carbon atoms, preferably 1 to 4 carbon atoms, etc.), a lower alkoxy groups an alkoxy group having 1 to 6 carbon atoms, preferably 1 to 4 carbon atoms, etc.), a thioalkyl group having 1 to 6 carbon atoms, an alkylamino group having 1 to 6 carbon atoms, an acylamino group having 1 to 6 carbon atoms, a halogeno group such as a chloro group, and a polar group (the polar group does not include the —SO$_3$M group). Among them, the substituent other than the —SO$_3$M group is preferably a polar group (the polar group does not include the —SO$_3$M group).

A disazo compound of the general formula (1) in which a substituent other than the —SO$_3$M group in $Q^1$ is a polar group is preferable because it is further excellent in solvent solubility, and is hardly crystallized in a polarizing film.

Examples of the polar group include an amino group, a hydroxyl group, a carboxyl group, a carboxylic acid amide group, and other functional group containing oxygen and/or nitrogen atoms which have relatively high electronegativity.

The number of substitutions l of the —SO$_3$M group in the formula (Q1-1) is preferably 1 to 3, more preferably 1 or 2, and particularly preferably 1. A disazo compound of the general formula (1) in which the number of —SO$_3$M groups substituted with $Q^1$ is 1 can form a more stable association structure in a solvent.

The number of substitutions m of the substituent Y in the formula (Q1-1) is preferably 0 to 2, and more preferably 0 to 1. When the number of substituents Y is excessively large, the association structure of disazo compounds may be destabilized in a solvent.

$Q^1$ in the general formula (1) is especially preferably any of phenyl groups represented by the following general formulae (Q1-2) to (Q1-5).

In general formulae (Q1-2) and (Q1-3), Y represents the same as in the general formula (Q1-1).

(Q1-2)

(Q1-3)

(Q1-4)

(Q1-5)

$Q^2$ in the general formula (1) is not particularly limited as long as it is a naphthylene group having at least one —SO$_3$M group as a substituent.

Examples of a naphthylene group represented by $Q^2$ include, a naphthylene group having one —SO$_3$M group, a naphthylene group having two or three —SO$_3$M groups, a naphthylene group having four to six —SO$_3$M groups, and a naphthylene group having one to four —SO$_3$M groups and to substituent other than the —SO$_3$M group.

For example, $Q^2$ is a naphthylene group represented by the following general formulae (Q2-1) to (Q2-3).

(Q2-1)

(Q2-2)

(Q2-3)

In general formulae (Q2-1) to (Q2-3), Z represents a substituent other than the —SO$_3$M group, subscript o denotes the number of substitutions of Z, subscript n denotes the number of substitutions of the —SO$_3$M group, n represents an integer of 1 to 6, and o represents an integer of 0 to 5. Here, $1 \leq n+o \leq 6$. When the number of substitutions o is two or more, each Z may be the same or different.

In general formulae (Q2-1) to (Q2-3), the substituents of (SO$_3$M)$_n$ and Z$_o$ may be each situated at any position in the naphthalene ring.

The substituent other than the —SO$_3$M group, which is represented by Z, is not particularly limited, but as substituent having an acyclic structure is preferable because it hardly hinders formation of an association. Specific examples of the substituent other than the —SO₃M group include a lower alkyl group (an alkyl group having 1 to 4 carbon atoms, preferably an alkyl group having 1 to 6 carbon atoms, etc.), a lower alkoxy group (an alkoxy group having 1 to 4 carbon atoms, preferably an alkoxy group having 1 to 4 carbon atoms, etc.), a thioalkyl group having 1 to 6 carbon atoms, an alkylamino group having 1 to 6 carbon atoms, an acylamino group having 1 to 6 carbon atoms, a halogeno group such as a chloro group, and a polar groups (the polar group does not include the —SO₃M group). Among them, the substituent other than the —SO₃M group is preferably a polar group (the polar group does not include the —SO₃M group).

A disazo compound of the general formula (1) in which a substituent other than the —SO₃M group in $Q^2$ is a polar group is preferable because it is further excellent in solvent solubility, and is hardly crystallized in a polarizing film.

Examples of the polar group include an amino group, a hydroxyl group, a carboxyl group, a carboxylic acid amide group, and other functional group containing oxygen and/or nitrogen atoms which have relatively high electronegativity.

The number of substitutions n of the —SO₃M group in the formulae (Q2-1) to (Q2-3) is preferably 1 to 3, more preferably 1 or 2, and particularly preferably 1. A disazo compound of the general formula (1) in which the number of —SO₃M groups in $Q^2$ is 1 can form a more stable association structure in a solvent.

The number of substitutions o of the substituent Z other than the SO₃M group is preferably 0 to 2, and more preferably 0 to 1. When the number of substituents Z is excessively large, the association structure of disazo compounds may be destabilized in a solvent.

As $Q^2$ in the general formula (1), naphthylene groups represented by the general formulae (Q2-4) to (Q2-7) are particularly preferable.

In general formulae (Q2-4) and (Q2-5), Z is identical to that in the general formula (Q2-1).

(Q2-4)

(Q2-5)

(Q2-6)

(Q2-7)

Naphthylene groups represented by the general formulae (Q2-1) and (Q2-4) to (Q2-7) have an effect of enhancing dielectric anisotropy in the molecular minor axis direction in the molecule of a disazo compound. Any of naphthylene groups represented by the aforementioned general formulae acts in favor of formation of an association of disazo compounds, and therefore a disazo compound having this naphthylene group has higher dichroism.

Further, a disazo compound having a naphthylene group represented by the general formula (Q2-6) or (Q2-7) and any of phenyl groups represented by the general formulae (Q1-2) to (Q1-5) can also be synthesized with raw materials that are generally used. Accordingly, such a disazo compound can be inexpensively synthesized, and therefore a polarizing film can be inexpensively produced from the disazo compound.

The disazo compounds represented by the general formulae (1) and (2) can be synthesized in accordance with "Riron Seizoh, Senryo Kagaku (Theory Production, Dye Chemistry), 5th Edition" written by Yutaka Hosoda (published by Gihodo Shuppan Co., Ltd. on Jul. 15, 1968, pages 135 to 152).

For example, a monoazo aniline, compound is obtained by converting an aniline compound having at least one —SO₃M group as a substituent into a diazonium salt, and subjecting the salt to a coupling reaction with an aminonaphthalenesulfonic acid compound. After the monoazo aniline compound is converted into a diazonium salt, the above-mentioned disazo compound represented by the general formulae (1) and (2) can be obtained by carrying out a coupling reaction with a 7-anilino-4-hydroxy-2-naphthalenesulfonic acid under weakly alkaline.

The polarizing film of the present invention includes a disazo compound represented by the above general formula (1), and the content thereof is not particularly limited. For example, the content of the disazo compound in the polarizing film is 50% by mass to 100% by mass, and preferably 80% by mass to 100% by mass.

The polarizing film of the present invention may include other component in addition to the disazo compound represented by the above general formula (1). Examples of the other component include a disazo compound other than those of the general formula (1), a monoazo compound, a colorant other than the azo compound, a polymer, and an additive. Examples of the additive include a compatibilizer, a surfactant, a heat stabilizer, a light stabilizer, a lubricant, an antioxidant, a flame retardant, and an antistatic agent.

The content of the other component is not particularly limited, and is, for example, more than 0% by mass and not more than 50% by mass, preferably more than 0% by mass and not more than 20% by mass.

The polarizing film of the present invention has a high dichroic ratio at least at partial wavelength between the wavelength of 380 nm and 780 nm. The dichroic ratio of the polarizing film is preferably 15 or more, and more preferably 20 or more. Here, the dichroic ratio is obtained by methods described in the following Examples. According to the present invention, a polarizing film having a dichroic ratio of 20 or more can be provided.

The degree of polarization of the polarizing film of the present invention is preferably 97% or more, more preferably 98% or more, and particularly preferably 99% or more. The degree of the polarization can be adjusted according to a thickness of the film, for example.

The transmittance of the polarizing film (measured at a wavelength of 550 nm and 23° C.) is preferably 35% or more, and more preferably 40% or more.

Further, the degree of polarization and the transmittance can be measured using a spectrophotometer (product name: "V-7100", manufactured by JASCO Corp.).

The thickness of the polarizing film of the present invention is not particularly limited, and it is preferably 0.05 μm to 5 μm and more preferably 0.1 μm to 1 μm.

As to the reason why a polarizing film including a disazo compound represented by the general formula (1) has a high dichroic ratio, the present inventors assume the following theories.

When the disazo compound of the general formula (1) is dissolved or dispersed in a solvent, a plurality of disazo compounds form an association in the liquid. When a plurality of disazo compounds having a molecular structure of the general formula (1) associate, —SO$_3$M groups of adjacent disazo compounds are hard to repel each other. Accordingly, it is thought that the disazo compounds form a stable association, and a polarizing film formed from the association has a high dichroic ratio.

Further, in the disazo compound represented by the general formula (1), $Q^1$ is a phenyl group, it is thought that absorption dichroism is enhanced because a phenyl group is positioned at the site of $Q^1$ in the disazo compound having a molecular structure of the general formula (1).

[Coating Solution and Method for Producing Polarizing Film According to the Present Invention]

The method for producing a polarizing film according to the present invention includes a step of applying onto a substrate a coating solution containing a disazo compound represented by the above general formula (1) and a solvent. Here, "applying" means that a coating film is formed by flow-casting or applying a liquid onto a substrate.

The method for producing a polarizing film according to the present invention includes the aforementioned step as a prerequisite, and may include other step. For example, the production method may include a step of drying a coating film obtained from the aforementioned step. The substrate is preferably a substrate given an alignment control force.

The polarizing film of the present invention can be produced through, preferably the following steps A and B; and after the step B, the following step C may be performed:

step A: a step of forming a coating film by applying a coating solution containing the disazo compound and a solvent on a substrate.

step B: a step of drying the coating film.

step C: a step of performing water-resistant treatment to the surface of the coating film which is dried in the step B.

The coating solution includes a disazo compound represented by the general formula (1) and a solvent that can dissolve or disperse the disazo compound. The disazo compounds used are not particularly limited as long as they are included in the general formula (1), and the compounds may be selected to use alone or in combination of two or more kinds.

The coating solution is obtained by dissolving or dispersing the disazo compounds in a solvent such as an aqueous solvent.

Other component other than the disazo compound may be added to the solvent as necessary.

The solvent is not particularly limited, and the conventionally known solvent may be used, but an aqueous solvent is preferable. Examples of the aqueous solvent include water, a hydrophilic solvent, and a mixed solvent containing water and the hydrophilic solvent. The hydrophilic solvent is a solvent, which can be dissolved with water uniformly. Examples of the hydrophilic solvent include alcohols such as methyl alcohol, ethyl alcohol, and isopropyl alcohol; glycols such as ethylene glycol, and diethylene glycol; cellosolves such as methyl cellosolve, and ethyl cellosolve; esters such as acetic ether; and the like. Preferably, water or a mixed solvent containing water and a hydrophilic solvent is used.

The coating solution exhibits a liquid crystal phase by changing the concentration of liquid temperature and disazo compounds. That is, a disazo compound represented in the general formula (1) is a lyotropic liquid crystalline compound.

This liquid crystal phase is exhibited by a disazo compound forming an association in a solvent. The liquid crystal phase is not particularly limited, and examples of the liquid crystal phase include a nematic liquid crystal phase, a smectic liquid crystal phase, a cholesteric liquid crystal phase, a hexagonal liquid crystal phase, and the like. The liquid crystal phase can be identified and confirmed from an optical pattern when observed by using a polarization microscope.

The concentration of the disazo compounds in the coating solution is not particularly limited, but the concentration of which the disazo compounds are not precipitated is preferable. The coating solution may have the concentration of which the liquid crystal phase is exhibited or not exhibited. The concentration of the disazo compounds in the coating solution is preferably 0.05% by mass to 50% by mass, more preferably 0.5% by mass to 40% by mass, and particularly preferably 2% by mass to 30% by mass.

The pH of the coating solution is appropriately prepared. The pH of the coating solution is preferably pH 2 to 10, and more preferably pH 6 to 8.

Further, the temperature of the coating solution is prepared preferably 10° C. to 40° C., and more preferably 151° C. to 30° C.

The coating film may be formed by applying the coating solution on an appropriate substrate.

The substrate is used for uniformly developing the coating solution. The type of the substrate is not particularly limited as far as it is proper to the object. Examples of the substrate include a polymer film, a glass plate, a metal plate, and the like. Hydrophilic treatment such as corona treatment may be performed for the substrate surface on which the coating solution is to be coated.

An aligned film may be used as the polymer film. Since the aligned film has an alignment control force on its surface, the disazo compounds in the liquid can be surely aligned. An aligned film can be obtained by giving an alignment control force to the film, for example. Examples of the method for giving an alignment control force include: subjecting the surface of the film to a rubbing treatment; forming a film of polyimide or the like on the surface of the film, and subjecting the surface of the film to a rubbing treatment; forming a film composed of a photoreactive compound on the surface of the film, and irradiating the film with light to form an alignment layer; and the like.

Preferably, a polymer film such as an aligned film is used as a substrate, and a polymer film excellent in transparency (for example, having a haze value of 3% or less) is preferably used.

As a material for the polymer film, polyester type such as polyethylene terephthalate; cellulose type such as triacetylcellulose; polycarbonate type; acryl type such as polymethyl methacrylate; styrene type such as polystyrene; olefin type such as polypropylene, and polyolefin having a ring-shaped or a norbornen structure; and the like can be cited. A norbornen type film is preferably used to align the disazo compounds sufficiently.

The method for applying a coating solution is not particularly limited, and for example, an application method using a previously known coater may be employed. Examples of the coater include a bar coater, a roll coater, a spin coater, a comma coater, a gravure coater, an air knife coater, and a die coater.

When the coating solution is applied to the surface of a substrate, shearing stress is applied to an association of disazo compounds in the process of flowing of the coating solution. Accordingly, the longitudinal direction of the association becomes parallel to the flow direction of the coating solution, so that a coating film in which the association of disazo compounds is aligned can be formed on the substrate. In the coating solution of the present invention, disazo compounds form a stable association, and therefore a coating film in which the disazo compounds substantially uniformly are aligned can be formed.

For enhancing alignment of the disazo compounds, a magnetic field, an electric field, or the like may be applied as required after the coating film is formed.

After the coating solution is applied to form a coating film, the uncured coating film is dried.

Drying of the uncured coating film can be performed by natural drying, forced drying, or the like. Examples of the forced drying include drying under reduced pressure, drying by heating, drying by heating under reduced pressure, and the like.

The concentration increases in the process of drying in the drying step, so that aligned disazo compounds are fixed. When alignment of the disazo compounds in the coating film is fixed, absorption dichroism a property of the polarizing film, is provided. The obtained dry coating film can be used as a polarizing film.

The polarizing film of the present invention can be formed by a solution casting method using a coating solution as described above. Thus, an extremely thin polarizing film can be produced according to the present invention. The thickness of the obtained polarizing film is, for example, 0.05 μm to 10 μm, preferably 0.05 μm to 5 μm, and more preferably 0.1 μm to 1 μm.

For imparting water resistance to the surface of the dried coating film, the following treatment may be performed.

Specifically, a solution containing at least one compound salt selected from the group consisting of an aluminum salt, a barium salt, a lead salt, a chromium salt, a strontium salt, a cerium salt, a lanthanum salt, a samarium salt, an yttrium salt, a copper salt, an iron salt, and a compound salt having two or more amino groups per molecule is brought into contact with the surface of the dry coating film.

By performing this treatment, a layer containing the compound salt is formed on the surface of the dry coating film. By forming such a layer, the surface of the dry coating film can be made insoluble or hardly soluble in water. Accordingly, water resistance can be imparted to the dry coating film (polarizing film).

The surface of the obtained polarizing film may be washed with water or a cleaning liquid as required.

(Use of Polarizing Film of the Invention)

Figure 1:
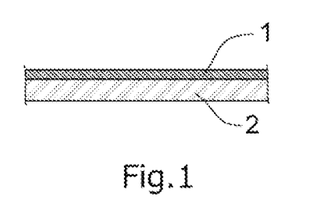
FIG. 1 is a local sectional view showing a polarizing film according to one embodiment.

A polarizing film 1 obtained by applying the coating solution on the substrate is laminated on a substrate 2 as shown in FIG. 1.

The polarizing film 1 of the present invention is generally used in the state that the polarizing film 1 is laminated on the substrate 2 such as a polymer film. However, the polarizing film 1 can be used by peeling off from the substrate 2.

Other optical film may be further laminated on the polarizing film 1 of the present invention. Examples of the other optical film include a protective film, a retardation film, and the like. A polarizing plate may be composed by laminating the protective film and/or the retardation film on the polarizing film of the present invention.

Figure 2:
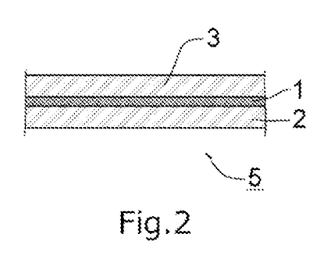
FIG. 2 is a local sectional view showing a polarizing plate according to one embodiment.

A polarizing plate 5 on which a protective film 3 is laminated to the polarizing film 1 of the present invention is illustrated in FIG. 2. This polarizing plate 5 includes the substrate 2 such as a polymer film, the polarizing film 1 laminated on the substrate 2, and the protective film 3 laminated on the polarizing film 1. The substrate 2 has a function to protect the polarizing film 1. Thus, the polarizing plate 5 includes the protective film 3 laminated on only one surface of the polarizing film 1.

Further, it is not particularly illustrated in Figures, however, other optical film such as a retardation film may be laminated on the polarizing plate 5.

When any other optical film is laminated to the polarizing film, any appropriate adhesive layer is provided therebetween from a practical point of view. Examples of the material that forms the adhesive layer include an adhesive, a pressure sensitive adhesive, an anchor coating agent, and the like.

Use of the polarizing film of the present invention is not particularly limited. The polarizing film of the present invention can be used for, for example, a composition member of image display devices such as a liquid crystal display device, an organic EL display device.

When the image display device is a liquid crystal display device, the preferable use thereof is a TV set, a portable device, a video camera, and the like.

EXAMPLES

The present invention is further described using Examples and Comparative Examples as follows. However, the present invention is not limited to only these Examples below. Further, methods for each analysis used in Examples are as follows.

[Method for Measuring Dichroic Ratio of Polarizing Film]

A spectrophotometer (product name: "V-7100", manufactured by JASCO Corp.) equipped with a Glan-Thompson polarizer was used, and k1 and k2 of Y values subjected to vision sensitivity correction is calculated by radiating a measuring beam of a linearly polarized light into a polarizing film which is an object to be measured. The values k1 and k2 are substituted for the following equation, thereby calculating the dichroic ratio. Here, k1 represents the transmittance of the linearly polarized light in the maximum transmittance direction, and k2 represents the transmittance of the linearly polarized light in the direction perpendicular to the maximum transmittance direction.

Dichroic ratio=$\log(1/k2)/\log(1/k1)$             Equation:

[Observation Method of Liquid Crystal Phase]

A small amount of a coating solution obtained, by polyspuit was sandwiched between two glass slides and a liquid crystal phase was observed by using a polarization microscope (product name: "OPTIPHOT-POL" manufactured by Olympus Corporation) provided with a large-scale sample heating/cooling stage for microscopes (product name "10013L", manufactured by Japan High Tech Co. Ltd.).

[Measurement of Thickness of Polarizing Film]

A portion of the polarizing film formed on a norbornen type polymer film was peeled off from a polymer film and a step between the polymer film and the polarizing film was measured by using a three-dimensional non-contact surface form measuring system (product name: "Micromap MM5200," manufactured by Ryoka Systems Inc.).

Example 1

4-aminobenzenesulfonic acid (1 equivalent) was formed into a diazonium salt using sodium nitrite (1 equivalent) and hydrochloric acid (5 equivalents), and the diazonium salt was subjected to a coupling reaction with 5-amino-2-naphthalenesulfonic acid (1 equivalent) in a weakly-acidic hot and cold aqueous solution, thereby obtaining a monoazo compound. The monoazo compound (1 equivalent) was formed into a diazonium salt using sodium nitrite (1 equivalent) and hydrochloric acid (2.5 equivalents), and the diazonium salt was subjected to a coupling reaction with 7-anilino-4-hydroxy-2-naphthalenesulfonic acid (another name: phenyl J acid) (0.95 equivalents) in a weakly-basic hot and cold aqueous solution, thereby obtaining a disazo compound. For converting the sulfonic acid salt of the disazo compound into a lithium salt, the disazo compound was salted out with lithium chloride to thereby obtain a disazo compound represented by the following formula (E-1).

(E-1)

A coating solution having a disazo compound concentration of 25% by mass was prepared by dissolving the disazo compound of the above formula (E-1) in ion-exchanged water. This coating solution having a concentration of 25% by mass was observed at 23° C. in accordance with the method for observing a liquid crystal phase as described above, and was found to show a nematic liquid crystal phase.

The coating solution was diluted by further adding ion-exchanged water, thereby preparing a coating solution having a disazo compound concentration of 7% by mass.

A bar coater (product name: "Mayer rot HS4", manufactured by Bushman Co.) was used to apply the coating solution onto the surface of a norbornene type polymer film (product name: "ZEONOR", manufactured by Nippon Zeon Co., Ltd.) subjected to rubbing treatment and corona treatment, and the resultant was naturally dried. The dried coating film is the polarizing film.

The thickness of the obtained polarizing film was about 0.3 µm.

The dichroic ratio of the polarizing film was measured in accordance with the method for measuring a dichroic ratio as described above. The measurement results are shown in Table 1.

Example 2

A disazo compound represented by the following formula (E-2) was obtained in the same manner as in Example 1 except that 3-aminobenzenesulfonic acid was used instead of 4-aminobenzenesulfonic acid.

(E-2)

A coating solution having a disazo compound concentration of 25% by mass was prepared by dissolving the disazo compound of the above formula (E-2) in ion-exchanged water. This coating solution having a concentration of 25% by mass was observed at 23° C. in accordance with the method for observing a liquid crystal phase as described above, and was found to show a nematic liquid crystal phase.

The coating solution was diluted by further adding ion-exchanged water, thereby preparing a coating solution having a disazo compound concentration of 7% by mass.

A polarizing film was produced in the same manner as in Example 1 by using the coating solution having a concentration of 7% by mass.

The thickness of the obtained polarizing film was about 0.3 μm.

The dichroic ratio of the polarizing film was measured in accordance with the method for measuring the dichroic ratio as described above. The measurement result is shown in Table 1.

Comparative Example 1

A disazo compound represented by the following formula (C-1) was obtained in the same manner as in Example 1 except that 4-nitroaniline was used instead of 4-aminobenzenesulfonic acid.

The coating solution with insolubles precipitated therein was diluted by further adding ion-exchanged water, thereby preparing a coating solution having a disazo compound concentration of 7% by mass. The coating solution having a concentration of 7% by mass was observed at 23° C. in accordance with the method for observation of a liquid crystal phase as described above, and was found to show a nematic liquid crystal phase.

The coating solution was diluted, by further adding ion-exchanged water, thereby preparing a coating solution having a disazo compound concentration of 2% by mass.

A polarizing film was prepared in the same manner as in Example 1 using the coating solution having a concentration of 2% by mass.

The thickness of the obtained polarizing film was about 0.1 μm. However, the obtained polarizing film had crystals precipitated on its surface. The precipitation of crystals was confirmed by observing the surface of the polarizing film using a polarization microscope (product name "OPTIPHOT-POL", manufactured by Olympus Corporation).

The dichroic ratio of the polarizing film was measured in accordance with the method for measurement of the dichroic ratio as described above. The measurement result is shown in Table 1.

(C-1)

An attempt was made to prepare a coating solution having a disazo compound concentration of 25% by mass by dissolving the disazo compound of the above formula (C-1) in ion-exchanged water. At this concentration, however, some of disazo compounds were not dissolved, and insolubles were precipitated in the liquid.

Comparative Example 2

A disazo compound represented by the following formula (C-2) was obtained in the same manner as in Example 1 except that 7-amino-1,3-naphthalenedisulfonic acid was used instead of 4-aminobenzenesulfonic acid.

(C-2)

A coating solution having a disazo compound concentration of 25% by mass was prepared by dissolving the disazo compound of the above formula (C-2) in ion-exchanged water. This coating solution having a concentration of 25% by mass was observed at 23° C. in accordance with the method for observing a liquid crystal phase as described above, and was found to show a nematic liquid crystal phase.

The coating solution was diluted by further adding ion-exchanged water, thereby preparing a coating solution having a disazo compound concentration of 7% by mass.

A polarizing film was produced in the same manner as in Example 1 by using the coating solution having a concentration of 7% by mass.

The thickness of the obtained polarizing film was about 0.3 μm.

The dichroic ratio of the polarizing film was measured in accordance with the method for measuring the dichroic ratio as described above. The measurement results are shown in Table 1.

Comparative Example 3

A disazo compound represented by the following formula (C-3) was obtained in the same manner as in Example 1 except that 2-amino-1-naphthalenesulfonic acid was used instead of 4-aminobenzenesulfonic acid.

The dichroic ratio of the polarizing film was measured in accordance with the method for measuring the dichroic ratio as described above. The measurement result is shown in Table 1.

TABLE 1

|  | Disazo compound | Dichroic ratio |
|---|---|---|
| Example 1 | Formula (E-1) | 22.3 |
| Example 2 | Formula (E-2) | 21.4 |
| Comparative Example 1 | Formula (C-1) | 1.0 |
| Comparative Example 2 | Formula (C-2) | 2.8 |
| Comparative Example 3 | Formula (C-3) | 1.3 |

[Evaluation]

In the disazo compounds of the formulae (E-1) and (E-2), a phenyl group is bound at a part on the left side in the molecular longitudinal axis direction (part of $Q^1$ in the general formula (1)). The polarizing films of Examples 1 and 2 including such a disazo compound showed a very high dichroic ratio as shown in Table 1.

On the other hand, in the disazo compound of the formula (C-1), a phenyl group is bound at a part on the left side in the molecular longitudinal axis direction. The phenyl group does not have a —$SO_3M$ group as a substituent. The polarizing film of Comparative Example 1 including such a disazo com- (C-3)

pound showed a very low dichroic ratio as shown in Table 1. The reason for this is thought to be that the solvent solubility of the disazo compound of the formula (C-1) is poor, so that the disazo compound is easily precipitated as crystals in the polarizing film.

In the disazo compounds of the formulae (C-2) and (C-3), a naphthyl group is bound at a part on the left side in the molecular longitudinal axis direction. These disazo compounds are included in the general formula (I) in Patent Document 1. The solvent solubility of the disazo compounds was satisfactory, but the polarizing films of Comparative Examples 2 and 3 including these disazo compounds showed a very low dichroic ratio as shown in Table 1. The reason for this is thought to be that when this part is a naphthyl ring, dichroism is not enhanced.

A difference between the disazo compound of the general formula (1) in the present invention and the disazo compound of the general formula (I) in Patent Document 1 lies in whether the part on the left side in the molecular longitudinal axis direction is a phenyl group or a naphthyl group. However, the difference significantly influenced the dichroic ratio of the polarizing film. This effect could not be expected at the beginning.

INDUSTRIAL APPLICABILITY

The polarizing film of the present invention can be used for, for example, a composition member of an image display device, a polarizing sunglass, and the like.

The coating solution of the present invention can be used as a forming material for a polarizing film.

1. Polarizing film, 2. Substrate, 3. Protective film, 5. Polarizing plate

What is claimed is:

1. A polarizing film comprising a disazo compound represented by the following general formula (1):

(1)

wherein $Q^2$ represents a naphthylene group having at least one —$SO_3M$ group; X represents an alkyl group having 1 to 4 carbon atoms, an alkoxy group having 1 to 4 carbon atoms, a thioalkyl group having 1 to 4 carbon atoms, a halogeno group, or a polar group; subscript k denotes the number of substitutions of X and represents an integer of 0 to 5; M represents a counter ion, where when k is an integer of 2 or more, Xs are the same or different; and $Q^1$ represents a phenyl group represented by the following general formula (Q1-1):

(Q1-1)

wherein Y represents a substituent consisting of an acyclic structure other than the —$SO_3M$ group; subscript m denotes the number of substitutions of Y and represents an integer of 0 to 4; and subscript l denotes the number of substitutions of the —$SO_3M$ group and represents an integer of 1 to 5, where $1 \leq l+m \leq 5$, and when m is 2 or more, Ys are the same or different, and wherein the disazo compound is a component of the polarizing film.

2. The polarizing film according to claim 1, wherein $Q^2$ is a naphthylene group represented by the following general formula (Q2-1):

(Q2-1)

wherein Z represents a substituent other than the —$SO_3M$ group; subscript o denotes the number of substitutions of Z and represents an integer of 0 to 5; and subscript n denotes the number of substitutions of the —$SO_3M$ group and represents an integer of 1 to 6, where $1 \leq n+o \leq 6$, and when o is 2 or more, Zs are the same or different.

3. The polarizing film according to claim 1, wherein $Q^2$ is a naphthylene group represented by any of the following formulae.

4. The polarizing film according to claim 1, wherein $Q^1$ is a phenyl group represented by any of the following formulae.

5. An image display device including the polarizing film according to claim 1.

6. A method for producing a polarizing film comprising a step of applying onto a substrate a coating solution containing a disazo compound represented by the following general formula (1) and a solvent, (1)

wherein $Q^2$ represents a naphthylene group having at least one —$SO_3M$ group; X represents an alkyl group having 1 to 4 carbon atoms, an alkoxy group having 1 to 4 carbon atoms, a thioalkyl group having 1 to 4 carbon atoms, a halogeno group, or a polar group; k denotes the number of substitutions of X and represents an integer of 0 to 5; and M represents a counter ion, where when k is an integer of 2 or more, Xs are the same or different; and $Q^1$ represents a phenyl group represented by the following general formula (Q1-1):

(Q1-1)

wherein Y represents a substituent consisting of an acyclic structure other than the —$SO_3M$ group; subscript m denotes the number of substitutions of Y and represents an integer of 0 to 4; and subscript l denotes the number of substitutions of the —$SO_3M$ group and represents an integer of 1 to 5, where $1 \leq l+m \leq 5$, and when m is 2 or more, Ys are the same or different, and wherein the disazo compound is a component of the polarizing film.

* * * * *